United States Patent
Nishiwaki

(10) Patent No.: US 8,094,371 B2
(45) Date of Patent: Jan. 10, 2012

(54) MICROSCOPE

(75) Inventor: Daisuke Nishiwaki, Tokyo (JP)

(73) Assignee: Olympus Corporation, Tokyo (JP)

( * ) Notice: Subject to any disclaimer, the term of this patent is extended or adjusted under 35 U.S.C. 154(b) by 202 days.

(21) Appl. No.: 12/486,420

(22) Filed: Jun. 17, 2009

(65) Prior Publication Data
US 2010/0053740 A1 Mar. 4, 2010

(30) Foreign Application Priority Data
Aug. 26, 2008 (JP) .................................. 2008-216873

(51) Int. Cl.
*G02B 21/06* (2006.01)
*G02B 21/00* (2006.01)
(52) U.S. Cl. .................... 359/388; 359/368; 359/385
(58) Field of Classification Search .......... 359/368–390, 359/821, 438.01–494.01
See application file for complete search history.

(56) References Cited

U.S. PATENT DOCUMENTS

| | | | | |
|---|---|---|---|---|
| 5,241,364 A | * | 8/1993 | Kimura | 356/491 |
| 5,751,475 A | * | 5/1998 | Ishiwata et al. | 359/387 |
| 6,130,776 A | * | 10/2000 | Takaoka | 359/370 |
| 2005/0168808 A1 | | 8/2005 | Ishiwata | |

FOREIGN PATENT DOCUMENTS

| | | |
|---|---|---|
| JP | 11-084260 A | 3/1999 |
| JP | 2004-354650 A | 12/2004 |
| JP | 2005-173288 A | 6/2005 |

* cited by examiner

*Primary Examiner* — Thong Nguyen
(74) *Attorney, Agent, or Firm* — Holtz, Holtz, Goodman & Chick, PC

(57) ABSTRACT

The microscope comprises a first phase-contrast objective including a first phase film shaped like a ring and having a 20-fold magnification or lower, a second phase-contrast objective including a second phase film shaped like a ring and having a 60-fold magnification or higher; and a ring slit shared and used by the first and second phase-contrast objectives.

9 Claims, 6 Drawing Sheets

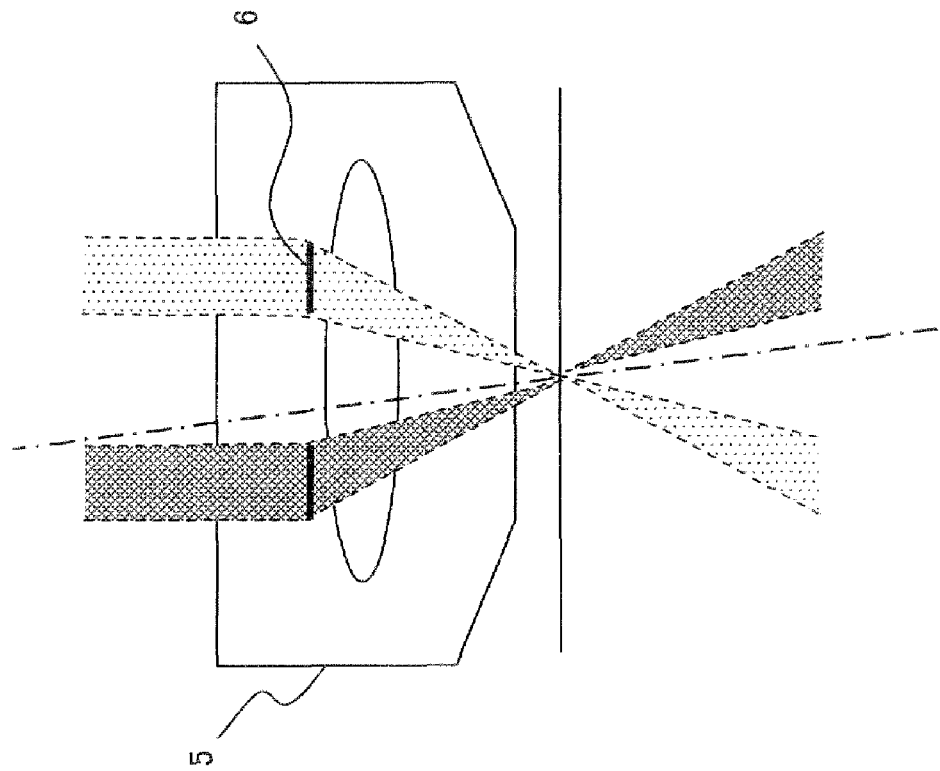
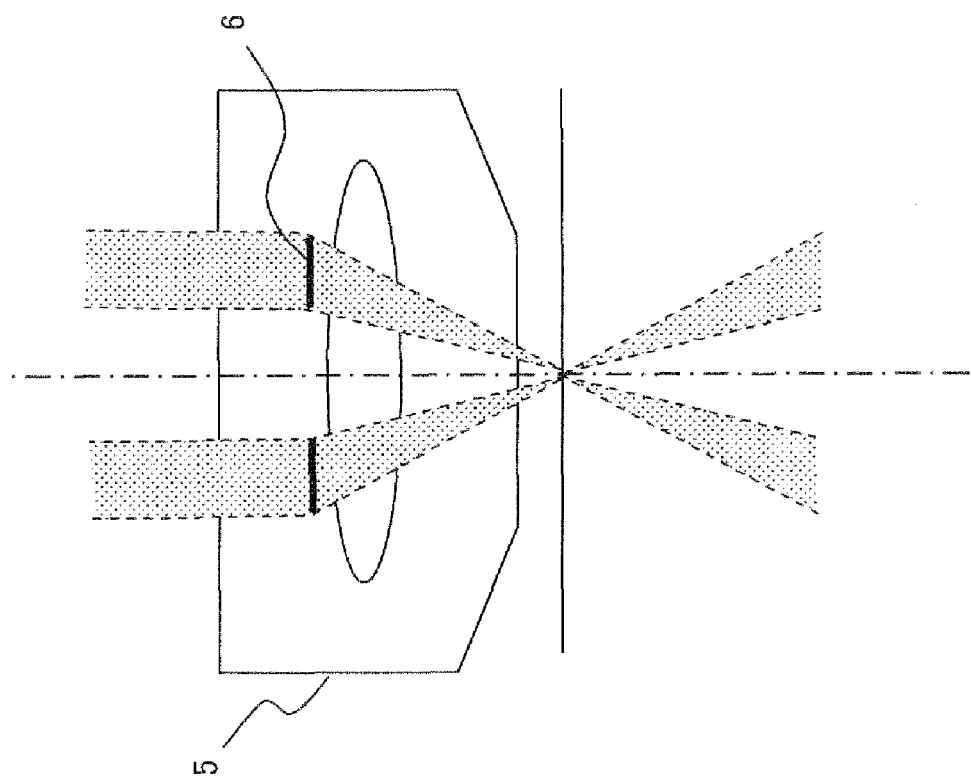

MICROSCOPE

CROSS REFERENCE TO RELATED APPLICATIONS

This application is based upon and claims the benefit of priority from the prior Japanese Patent Application No. 2008-216873, filed Aug. 26, 2008, the entire contents of which are incorporated herein by reference.

BACKGROUND OF THE INVENTION

1. Field of the Invention

The present invention relates to a microscope technology, and particularly to a microscope used for the phase-contrast observation and the fluorescence observation.

2. Description of the Related Art

In the field of microscopy, the phase-contrast observation is an observation method that has been in use for a long time. When the phase-contrast observation method is used, the distribution of the refractive indices of a phase object (substantially transparent; only refractive indices are different) such as a specimen from a living-body can be visualized. Therefore, phase-contrast observation has been an appreciated method in biological disciplines.

In contrast, in the field of microscopy, fluorescence observation is an observation method that has grown importance in relatively recent years. In fluorescence observation, a fluorescent material is introduced into a specimen prior to observation and excitation light is irradiated onto the specimen. Then, by detecting fluorescent light generated from the specimen, the specimen is observed. In this case, by localizing the fluorescent material in a specific region in the specimen, fluorescence can be emitted from a portion of the specimen that is desired to be seen. Alternately, by relating the fluorescent material to a specific protein in the specimen, information directly related to an organic activity can be obtained.

In fluorescence observation, however, the shape of a specimen cannot be observed well. Therefore, it is necessary to examine which region in the specimen is emitting fluorescence using another observation technique. In this case, a differential interference contrast observation and a phase-contrast observation are generally used.

With a differential interference contrast microscope, however, a specimen is observed using polarized light. In differential interference contrast observation, therefore, the use of plastic-bottom dishes, which are often used for the observation of specimens from a living body, is limited.

In phase-contrast observation, by contrast, a microscope needs to comprise a special objective and a special condenser lens for the phase-contrast observation; and further it needs to comprise a ring slit placed at its pupil position. Therefore, when the phase-contrast observation and the fluorescence observation are combined to perform an observation, the overall number of parts used in the microscope is high. Since different parts are needed for the respective observations, the work of changing parts needs to be done. This hinders the ability to simultaneously perform phase-contrast observation and fluorescence observation.

SUMMARY OF THE INVENTION

The microscope according to one mode of the present invention comprises a first phase-contrast objective including a first phase film shaped like a ring and having a 20-fold magnification or lower, a second phase-contrast objective including a second phase film shaped like a ring and having a 60-fold magnification or higher, and a ring slit shared and used by the first and second phase-contrast objectives.

BRIEF DESCRIPTION OF THE DRAWINGS

The present invention will be more apparent from the following detailed description when the accompanying drawings are referenced.

FIG. 2A is a diagram illustrating a state in which laser beams having intensities symmetrical with respect to the center of a phase film are irradiated onto the phase film.

FIG. 2B is a diagram illustrating a state in which laser beams having intensities asymmetrical with respect to the center of a phase film are irradiated onto the phase film.

DESCRIPTION OF THE PREFERRED EMBODIMENTS

With reference to the drawings, the embodiments of the present invention will be described in the following.

Figure 1:
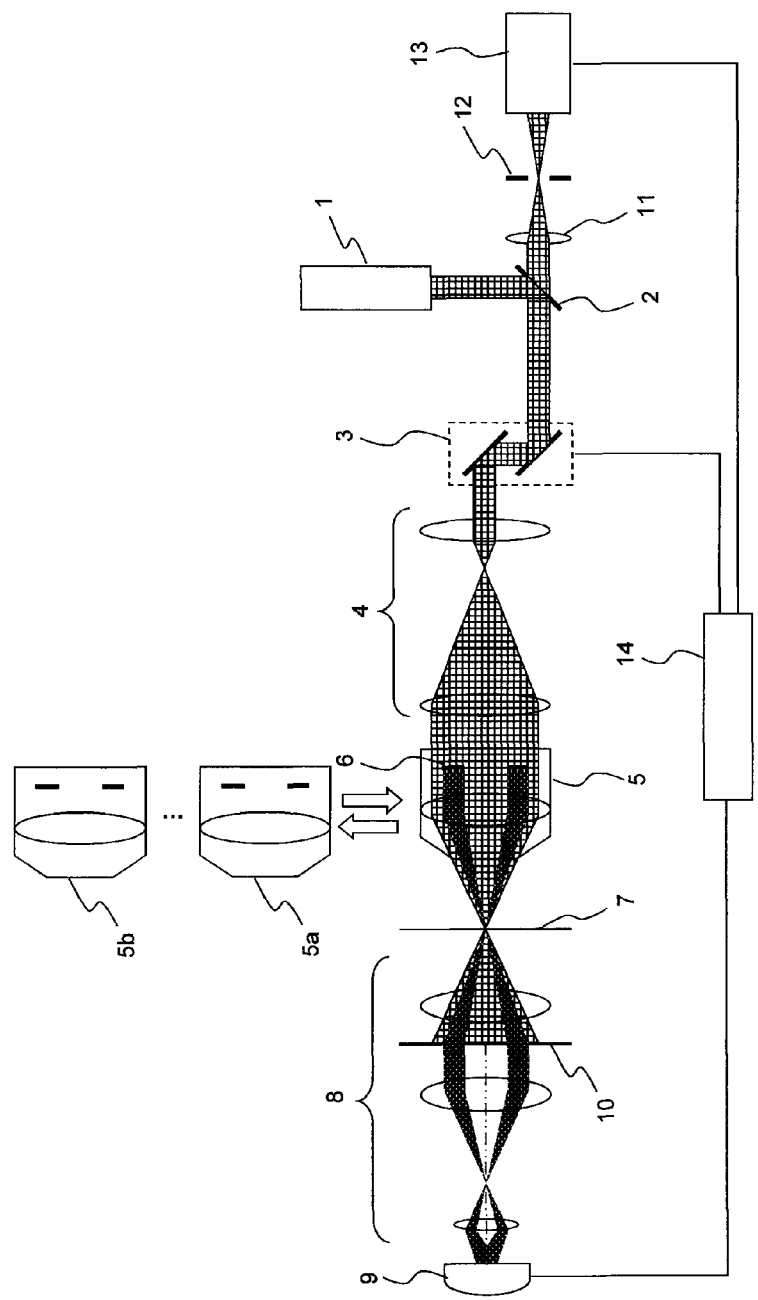
FIG. 1 is a diagram showing a configuration of the microscope according to one embodiment of the present invention.

FIG. 1 is a diagram showing a configuration of the microscope according to one embodiment of the present invention. As shown in FIG. 1, in the embodiment, a laser beam emitted from a laser beam source 1 is coupled to a fluorescent light detection light-path by light-beam separation means 2 such as a dichroic mirror. Then, the laser beam is deflected by a scan unit 3, such as a galvanometer mirror. In addition, the laser beam is incident on the pupil of an objective 5 via a pupil-projection optical system 4. In this case, the objective 5 is a phase-contrast objective and comprises a ring-shaped phase film 6 and a semipermeable membrane at its pupil position. The ring-shaped phase film 6 changes the phase of a laser beam transmitted through the phase film 6 by $+\frac{1}{4}$ phase or $-\frac{1}{4}$ phase. Then, the laser beam is condensed to a specimen surface 7 by the objective 5. Each of objectives 5a and 5b illustrated in FIG. 1 is an objective to be switched with the objective 5.

Transmitted light transmitted through the specimen surface 7 is led to a transmitted light detector 9 (second detector) via a transmission detection optical system 8. A ring slit 10 is placed at the pupil position of the transmission detection optical system 8. In other words, the ring slit 10 is placed at a position conjugate to the pupil position of the objective 5. The aperture of the ring slit 10 is placed at a position, from the positions in the pupil position, corresponding to the phase film 6. In other words, the direct light of the laser beam transmitted through the phase film 6 passes through the aperture of the ring slit 10. In such a configuration, the direct light of the laser beam transmitted through the phase film 6 and diffraction light diffracted by a specimen pass through the ring slit 10. Therefore, transmitted light corresponding to a certain point on the specimen and made by the direct light and the diffraction light interfering with each other is detected by the transmitted light detector 9. As a result of this, phase information corresponding to the certain point on the specimen is obtained. By scanning the phase information of the certain point by means of the scan unit 3, the phase-contrast image of the entirety of the specimen is formed. This means that the transmitted light detector 9 is used for the phase-contrast observation.

The transmitted light detector 9 is placed in the vicinity of a position conjugate to the pupil position of the transmission detection optical system 8. In the present embodiment, therefore, confocal detection is not performed for the detection of transmitted light performed by the transmitted light detector 9. In addition, detection of transmitted light does not lead to the execution of descanning in which the scan unit is once again used to undo a scan.

Meanwhile, in the present embodiment, a confocal technique is used to detect fluorescent light. In other words, a laser beam emitted from a laser beam source 1 is coupled to a fluorescent light detection light-path by light-beam separation means 2, such as a dichroic mirror. Then, the laser beam is deflected by the scan unit 3, such as a galvanometer mirror, and excites fluorescent dye in the specimen. This causes radiated fluorescent light to adversely proceed through the light path of a laser beam. Then, the fluorescent light is separated from excitation light by light-beam separation means 2 after execution of descanning by the scan unit 3. The separated fluorescent light is focused on a confocal pinhole 12 by a confocal lens 11. In other words, a spot projected on the confocal pinhole is conjugate to a spot on the specimen surface. The fluorescent light transmitted through the confocal pinhole 12 is detected by a fluorescent light detector 13 (first detector) and is imaged as a fluorescence image by an image processing unit 14. In other words, the fluorescent light detector 13 is used for the fluorescence observation.

The image processing unit 14 interlocks with the scan unit 3. By means of the state of the scan unit 3, the image processing unit 14 decides to which position on the specimen surface the detection result of the fluorescent light detector 13 corresponds. In addition, the image processing unit 14 also interlocks with the transmitted light detector 9. By means of the detection result of the transmitted light detector 9, the image processing unit 14 images phase-contrast information. In this case, the scan unit 3 is shared and used for transmitted light detection and fluorescent light detection. Therefore, a phase-contrast image and a fluorescent image can be accurately related to each other and can be accurately overlaid. Therefore, the phase-contrast image and the fluorescent image can be observed simultaneously.

In each of the embodiments, an optical fiber is not used between the laser beam source 1 and the objective 5. In addition, the laser beam source 1 is a semiconductor laser (laser diode). This configuration is preferred in that the configuration of the microscope as a whole is compact. In this case, more than one laser light sources 1 can be provided. The laser light sources 1 may be configured with a plurality of laser light sources that emit different wavelengths.

In each of the embodiments without the use of an optical fiber, a laser beam from a semiconductor laser is incident on the objective 5. In light of the reason described in the following, the relationship is defined between the phase film 6 in the objective 5 and the beam diameter of a laser beam.

FIG. 2A is a diagram illustrating a state in which laser beams having intensities that are symmetrical with respect to the center of the phase film 6 are irradiated onto the phase film 6. In this case, the symmetry of the laser beams are maintained on the ring slit 10 at a position conjugate to the phase film 6. In contrast, FIG. 2B is a diagram illustrating a state in which laser beams having intensities that are asymmetrical with respect to the center of the phase film 6 are irradiated onto the phase film 6. As illustrated in FIG. 2B, if laser beams having intensities that are asymmetrical with respect to the phase film 6 are irradiated, the medial axis of the intensities of the laser beams derives from an optical axis and is inclined. As a result of this, a phenomenon occurs in which an image moves in the direction of a visual field when a focal plane is moved (or when a specimen is moved in the direction of the optical axis). If this phenomenon occurs, the accuracy of image forming positions on different focal planes is degraded. In the configuration of the present embodiment, when a phase-contrast image and a fluorescent image using the confocal technique are overlaid, this phenomenon causes the degrading of the accuracy of the overlay.

Figure 3:
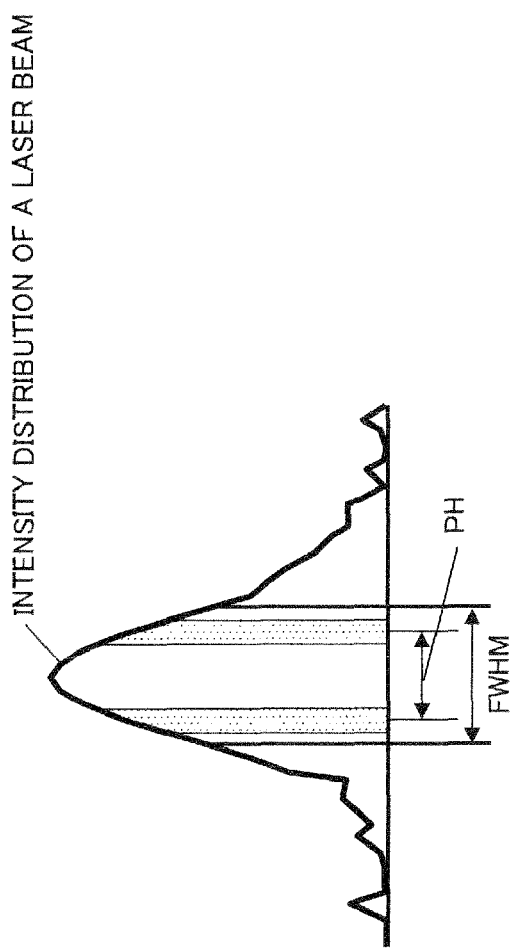
FIG. 3 is a diagram showing a relationship between the intensity distribution of a laser beam from a semiconductor laser and the central diameter of a phase film.

FIG. 3 is a diagram showing a relationship between the intensity distribution of a laser beam from a semiconductor laser and a central diameter PH of a phase film. The Gaussian intensity distribution is as a whole indicated as the intensity distribution of the laser beam from the semiconductor laser. However, a portion of the laser beam away from the center of the intensity distribution (hereinafter referred to as a peripheral laser beam) indicates intensity distribution that is asymmetrical with respect to the center of the intensity distribution and that is irregular. As a result of this, if a peripheral laser beam from the semiconductor laser is used, the phase film 6 will be irradiated by asymmetric intensities.

A galvanometer mirror used for a general laser scanning type microscope is called a proximity galvanometer mirror. A proximity galvanometer mirror is configured in such a way that a mirror for scanning a specimen in an X-axis and a mirror for scanning the specimen in a Y-axis are placed proximate to the positions before and after the pupil position. In other words, the proximity galvanometer mirror is not precisely placed at the position conjugate to the phase film 6. Therefore, the irradiation position of a laser beam to the phase film 6 changes due to the scanning performed by the proximity galvanometer mirror.

In light of the matters described above, the use of a peripheral laser beam is preferably avoided as much as possible. According to the configuration of the present embodiment, therefore, a relationship is defined as shown below between the beam diameter of a laser beam from the laser beam source and the central diameter of the phase film 6. In the present embodiment, when PH indicates the central diameter of the phase film and FWHM indicates a beam diameter that is the full-width half maximum of the longer axis of a laser beam, the following conditional expression (1) is satisfied.

$$0.1 \leq PH/FWHM \leq 1 \tag{1}$$

The pupil-projection optical system 4 is used to adjust the beam diameter such that conditional expression (1) is satisfied. Specifically, the adjustment is performed by changing its pupil-projection magnification. In the present embodiment, the pupil-projection optical system 4 has a 3.6-fold projection magnification.

Now, sharing of a ring slit will be described.

In regard to a phase-contrast objective, different ring slits are generally used for each magnification (or for each magnification range including approximate magnifications). This is because, since an objective with a low magnification tends to have a low numerical aperture (NA) and an objective with a high magnification tends to have a high NA, each of the lenses has an optimum ring slit for its NA. In each of the embodiments of the present invention, facilitation of an operation and reduction of a parts count are achieved by sharing a ring slit for low magnification and high magnification.

Figure 4A:
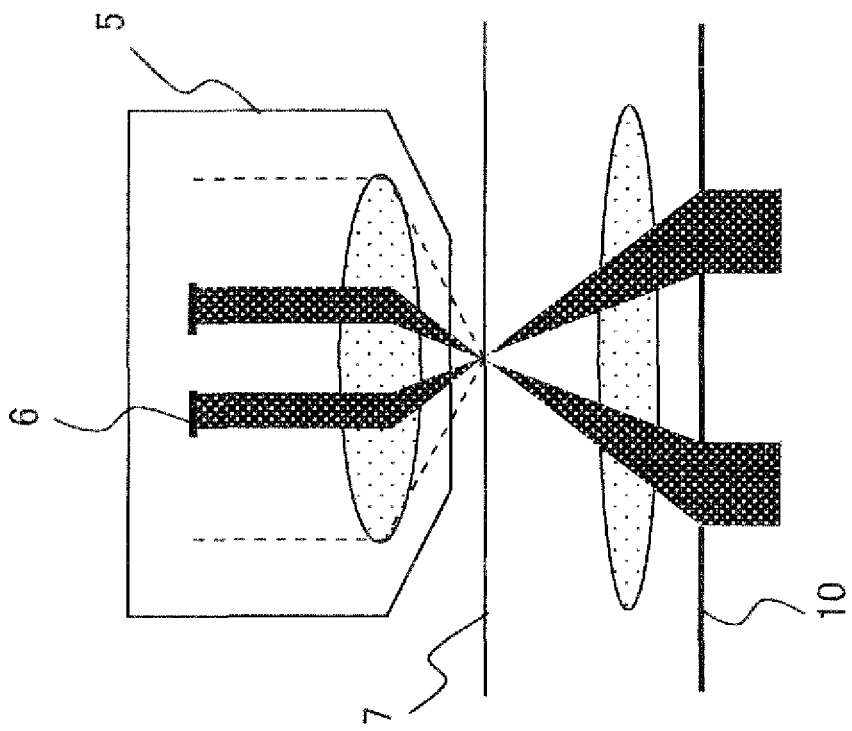
FIG. 4A is a diagram schematically showing a relationship between a phase film and a ring slit when using an objective with a low magnification.
Figure 4B:
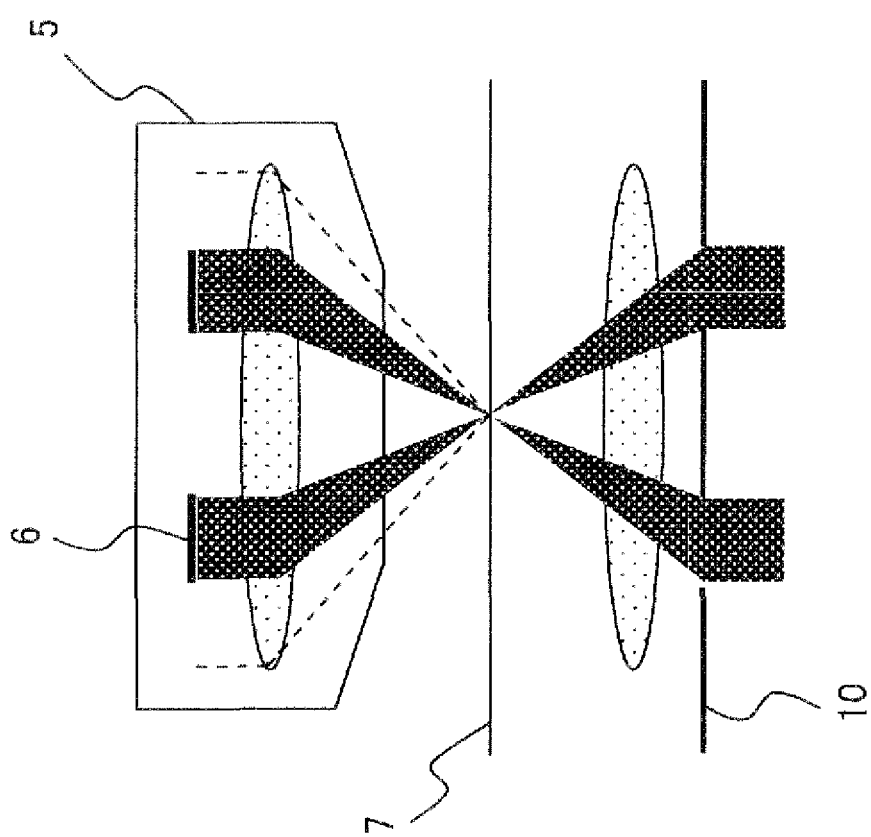
FIG. 4B is a diagram schematically showing a relationship between a phase film and a ring slit when using an objective with a high magnification.

FIGS. 4A and 4B are diagrams for illustrating the placement of the phase film 6 for achieving sharing of the ring slit 10.

FIG. 4A is a diagram schematically showing a relationship between the phase film 6 (first phase film) and the ring slit 10 when using the objective 5 (first phase-contrast objective) with low magnification. Although an objective with a low magnification generally has a low NA, its focal length is long. As a result of this, the aperture of the ring slit 10 is, as a relatively large ring, projected to the pupil plane of the objective 5. In other words, in order to relate the ring slit 10 to the phase film 6, the phase film 6 is shaped like a large ring.

In contrast, FIG. 4B is a diagram schematically showing a relationship between the phase film 6 (second phase film) and the ring slit 10 when using the objective 5 (second phase-contrast objective) with a high magnification. Although an objective with a high magnification generally has a high NA, its focal length is short. As a result of this, the aperture of the ring slit 10 is, as a relatively small ring, projected to the pupil plane of the objective 5. In regard to an objective with a high magnification, the ring slit 10 having a large diameter is usually used such that the ring diameter of the phase film 6 is not reduced. In each of the embodiments of the present invention, however, even if the magnification is high, the diameter of the ring slit 10 is not enlarged but sharing of the ring slit 10 for a high magnification and the ring slit 10 for a low magnification is achieved.

The merits of such a configuration are not simply limited to being a reduction in parts count caused by the sharing. In each of the embodiments of the present invention, an objective is shared by the phase-contrast observation and the fluorescence observation. In the fluorescence observation, therefore, the phase-film 6 is a hindrance to the observation. In each of the embodiments, however, since the sharing of the ring slit 10 is achieved between low and high magnification, the diameter of the phase film 6 is reduced under high magnification. As a result of this, the area of the phase film 6 is reduced, and therefore the fluorescence observation under a high magnification can be less affected.

More particularly, when a first phase-contrast objective with a 20-fold magnification or lower is used as an objective with a low magnification and a second phase-contrast objective with a 60-fold magnification or higher is used as an objective with a high magnification, the sharing of a ring slit is achieved between the first and second phase-contrast objectives.

Here, the following conditional expression (2) is desirably satisfied.

$$PH_{OB2}/OB_2 \leq 0.2 \tag{2}$$

In this expression, $OB_2$ indicates a pupil diameter of the second phase-contrast objective. $PH_{OB2}$ indicates a central diameter of the ring of the second phase film contained in the second phase-contrast objective.

When conditional expression (2) is satisfied, the size (diameter) of the projected image of the second phase film when the second phase film being projected to the pupil position of the transmission detection optical system 8 is substantially equal to the size (diameter) of the projected image of the first phase film when the first phase film being projected to the pupil position of the transmission detection optical system 8. Therefore, the sharing of a ring slit placed at the pupil position of the transmission detection optical system 8 can be achieved between the first and second phase-contrast objectives. In other words, the phase-contrast observation can be performed using the same ring slit. In addition, when conditional expression (2) is satisfied, the area of the phase film contained in the objective is necessarily reduced. As a result of this, if the objective above is used in the fluorescence observation, influence from the phase film is restrained. Therefore, the sharing of an objective can be achieved between the fluorescence observation and the phase-contrast observation.

If the second phase-contrast objective has 100-fold magnification or higher, it is further desirable that the following conditional expression (3) be satisfied.

$$PH_{OB2}/OB_2 \leq 0.15 \tag{3}$$

If the second objective satisfies the condition above, the microscope may further comprise a third phase-contrast objective with a magnification which is between that of the first and second phase-contrast objectives. In addition, the sharing of a ring slit may be achieved among the first, second and third phase-contrast objectives.

If the sharing of a ring slit is achieved between phase-contrast objectives with magnifications that are different to some extent, an objective with an intermediate magnification is desirably provided.

When $S_{OB2}$ indicates the area of the pupil of the second phase-contrast objective and $S_{PH2}$ indicates the area of the second phase film, the following conditional expression (4) is desirably satisfied.

$$S_{PH2}/S_{OB2} \leq 0.05 \tag{4}$$

When conditional expression (4) is satisfied, the area of the phase film is small. Therefore, the objective above can also be used for the fluorescence observation. If conditional expression (4) is satisfied, the size (diameter) of the projected image of the second phase film when the second phase film being projected onto the pupil position of the transmission detection optical system 8 is substantially equal to the size (diameter) of the projected image of the first phase film when the first phase film being projected onto the pupil position of the transmission detection optical system 8. Therefore, the sharing of the ring slit placed at the pupil position of the transmission detection optical system 8 can be achieved between the first and second phase-contrast objectives. In other words, the phase-contrast observation can be performed using the same ring slit.

If the second phase-contrast objective has a 100-fold magnification or higher, it is further desirable that the following conditional expression (5) be satisfied.

$$S_{PH2}/S_{OB2} \leq 0.03 \tag{5}$$

If the second objective satisfies the condition above, the microscope may further comprise a third phase-contrast objective with a magnification which is between that of the first and second phase-contrast objectives. In addition, the sharing of a ring slit may be achieved among the first, second and third phase-contrast objectives.

The following is a description of each of the embodiments of the present invention.

Embodiment 1

One example of the combination of a ring slit and an objective used in the embodiments is shown in the following.

The following table 1 shows the NA of the aperture of a ring slit A of the present embodiment.

TABLE 1

| NA of the ring slit A | | |
|---|---|---|
| Inner border | Outer border | Center |
| 0.13 | 0.15 | 0.14 |

In regard to the ring slit A, the combinations of the objectives illustrated by the combinations A1 to A5 in the following table 2 can be used.

TABLE 2

| | Magnification of the objective | NA of the objective | NA of the phase film Inner border (left column) Outer border (right column) | | Ratio of the central NA of the phase film relative to a pupil | Area ratio of the phase film relative to a pupil |
|---|---|---|---|---|---|---|
| Combination A1 | 10 | 0.4 | 0.12 | 0.16 | 0.35 | 0.070 |
| | 60 | 1.2 | 0.07 | 0.19 | 0.11 | 0.022 |
| Combination A2 | 10 | 0.4 | 0.12 | 0.16 | 0.35 | 0.070 |
| | 60 | 1.35 | 0.09 | 0.18 | 0.10 | 0.013 |
| Combination A3 | 10 | 0.4 | 0.12 | 0.16 | 0.35 | 0.070 |
| | 100 | 1.4 | 0.07 | 0.19 | 0.09 | 0.016 |
| Combination A4 | 20 | 0.75 | 0.12 | 0.16 | 0.19 | 0.020 |
| | 60 | 1.2 | 0.07 | 0.19 | 0.11 | 0.022 |
| Combination A5 | 10 | 0.3 | 0.12 | 0.16 | 0.47 | 0.124 |
| | 40 | 0.75 | 0.09 | 0.18 | 0.18 | 0.043 |
| | 100 | 1.4 | 0.07 | 0.19 | 0.09 | 0.016 |

As illustrated in table 2, in regard to objectives with a high magnification (60-fold and 100-fold) according to the combinations of the present embodiment, the ratio of the central NA of the phase film relative to a pupil is suppressed to being low. "Ratio of the central NA of the phase film relative to a pupil" is a ratio of "NA of the objective" relative to "central NA of the phase film", and it is calculated in the following expression.

Ratio of the central NA of the phase film relative to a pupil

=(*NA* of the inner border of the phase film+*NA* of the outer border of the phase film)/2/*NA* of the objective As illustrated in table 2, in regard to the objective with a high magnification, the area ratio of the phase film relative to a pupil is also suppressed to being low.

In addition, objectives with low, medium, and high magnification can be combined and used. In this case, as indicated by combination A5, in regard to the objective with a medium magnification (40-fold), the ratio of the central NA of the phase film relative to a pupil and the area ratio of the phase film relative to a pupil are also suppressed to being low.

In regard to combinations A1 to A5, if the objective with a 10-fold or 20-fold magnification is regarded as being a first phase-contrast objective and the objective with a 60-fold or 100-fold magnification is regarded as being a second phase-contrast objective, conditional expressions (2) and (4) are satisfied.

In regard to combination A5 according to the embodiment, if the objective with a 10-fold magnification is regarded as being a first phase-contrast objective, the objective with a 100-fold magnification is regarded as being a second phase-contrast objective, and the objective with a 40-fold magnification is regarded as being a third phase-contrast objective, then conditional expressions (3) and (5) mentioned above are satisfied.

The embodiment of the present invention is not limited to the combinations illustrated in the table above. More different magnifications may be combined and embodied.

Embodiment 2

The following table 3 shows the NA of the aperture of a ring slit B of the present embodiment.

TABLE 3

| NA of the ring slit B | | |
|---|---|---|
| Inner boder | Outer border | Center |
| 0.16 | 0.19 | 0.175 |

In regard to the ring slit B, the combinations of the objectives illustrated by the combinations B1 to B5 in the following table 4 can be used.

TABLE 4

| | Magnification of the objective | NA of the objective | NA of the phase film Inner border (left column) Outer border (right column) | | Ratio of the central NA of the phase film relative to a pupil | Area ratio of the phase film relative to a pupil |
|---|---|---|---|---|---|---|
| Combination B1 | 10 | 0.4 | 0.15 | 0.20 | 0.44 | 0.109 |
| | 60 | 1.2 | 0.10 | 0.23 | 0.14 | 0.030 |
| Combination B2 | 10 | 0.4 | 0.15 | 0.20 | 0.44 | 0.109 |
| | 60 | 1.35 | 0.12 | 0.22 | 0.13 | 0.019 |
| Combination B3 | 10 | 0.4 | 0.15 | 0.20 | 0.44 | 0.109 |
| | 100 | 1.4 | 0.10 | 0.23 | 0.12 | 0.022 |
| Combination B4 | 20 | 0.75 | 0.15 | 0.20 | 0.23 | 0.031 |
| | 60 | 1.2 | 0.10 | 0.23 | 0.14 | 0.030 |
| Combination B5 | 10 | 0.3 | 0.15 | 0.20 | 0.58 | 0.194 |
| | 40 | 0.75 | 0.12 | 0.22 | 0.23 | 0.060 |
| | 100 | 1.4 | 0.10 | 0.23 | 0.12 | 0.022 |

As illustrated in table 4 above, in regard to objectives with high magnifications (60-fold and 100-fold) according to the combinations of the present embodiment, the ratio of the central NA of the phase film relative to a pupil is suppressed to being low. As illustrated in table 4, in regard to the objective with a high magnification, the area ratio of the phase film relative to a pupil is also suppressed to being low.

In addition, objectives with low, medium, and high magnification can be combined and used. In this case, as indicated by combination B5, in regard to the objective with a medium magnification (40-fold), the ratio of the central NA of the phase film relative to a pupil and the area ratio of the phase film relative to a pupil are also suppressed to being low.

In regard to combinations B1 to B5, if the objective with a 10-fold or 20-fold magnification is regarded as being a first phase-contrast objective and the objective with a 60-fold or 100-fold magnification is regarded as being a second phase-contrast objective, conditional expressions (2) and (4) are satisfied. In regard to combination B5, if the objective with a 10-fold magnification is regarded as being a first phase-contrast objective, the objective with a 100-fold magnification is regarded as being a second phase-contrast objective, and the objective with a 40-fold magnification is regarded as being a third phase-contrast objective, then conditional expressions (3) and (5) are satisfied.

The embodiment of the present invention is not limited to the combinations illustrated in the table above. Other different magnifications may be combined and embodied.

Embodiment 3

The following table 5 shows the NA of the aperture of a ring slit C of the present embodiment.

TABLE 5

| NA of the ring slit C | | |
|---|---|---|
| Inner boder | Outer border | Center |
| 0.19 | 0.22 | 0.205 |

In regard to the ring slit C, the combinations of the objectives illustrated by the combinations C1 to C5 in the following table 6 can be used.

TABLE 6

| | Magnification of the objective | NA of the objective | NA of the phase film Inner border (left column) | NA of the phase film Outer border (right column) | Ratio of the central NA of the phase film relative to a pupil | Area ratio of the phase film relative to a pupil |
|---|---|---|---|---|---|---|
| Combination C1 | 10 | 0.4 | 0.18 | 0.23 | 0.51 | 0.128 |
| | 60 | 1.2 | 0.13 | 0.26 | 0.17 | 0.035 |
| Combination C2 | 10 | 0.4 | 0.18 | 0.23 | 0.51 | 0.128 |
| | 60 | 1.35 | 0.15 | 0.25 | 0.15 | 0.022 |
| Combination C3 | 10 | 0.4 | 0.18 | 0.23 | 0.51 | 0.128 |
| | 100 | 1.4 | 0.13 | 0.26 | 0.14 | 0.026 |
| Combination C4 | 20 | 0.75 | 0.18 | 0.23 | 0.27 | 0.036 |
| | 60 | 1.2 | 0.13 | 0.27 | 0.17 | 0.035 |
| Combination C5 | 10 | 0.3 | 0.18 | 0.23 | 0.68 | 0.228 |
| | 40 | 0.75 | 0.15 | 0.25 | 0.27 | 0.071 |
| | 100 | 1.4 | 0.13 | 0.26 | 0.14 | 0.026 |

As illustrated in table 6 above, in regard to objectives with a high magnification (60-fold and 100-fold) according to the combinations of the present embodiment, the ratio of the central NA of the phase film relative to a pupil is suppressed to being low. As illustrated in table 6, in regard to the objective with a high magnification, the area ratio of the phase film relative to a pupil is also suppressed to being low.

In addition, objectives with low, medium, and high magnifications can be combined and used. In this case, as indicated by combination C5, in regard to the objective with a medium magnification (40-fold), the ratio of the central NA of the phase film relative to a pupil and the area ratio of the phase film relative to a pupil are also suppressed to being low.

In regard to combinations C1 to C5, if the objective with a 10-fold or 20-fold magnification is regarded as being a first phase-contrast objective and the objective with a 60-fold or 100-fold magnification is regarded as being a second phase-contrast objective, conditional expressions (2) and (4) are satisfied. In regard to combination C5 according to the embodiment, if the objective with a 10-fold magnification is regarded as being a first phase-contrast objective, the objective with a 100-fold magnification is regarded as being a second phase-contrast objective, and the objective with a 40-fold magnification is regarded as being a third phase-contrast objective, then conditional expressions (3) and (5) mentioned above are satisfied.

The embodiment of the present invention is not limited to the combinations illustrated in the table above. Other different magnifications may be combined and embodied.

The following is a description of a microphotograph showing the effect of the embodiment 3.

Figure 5A:
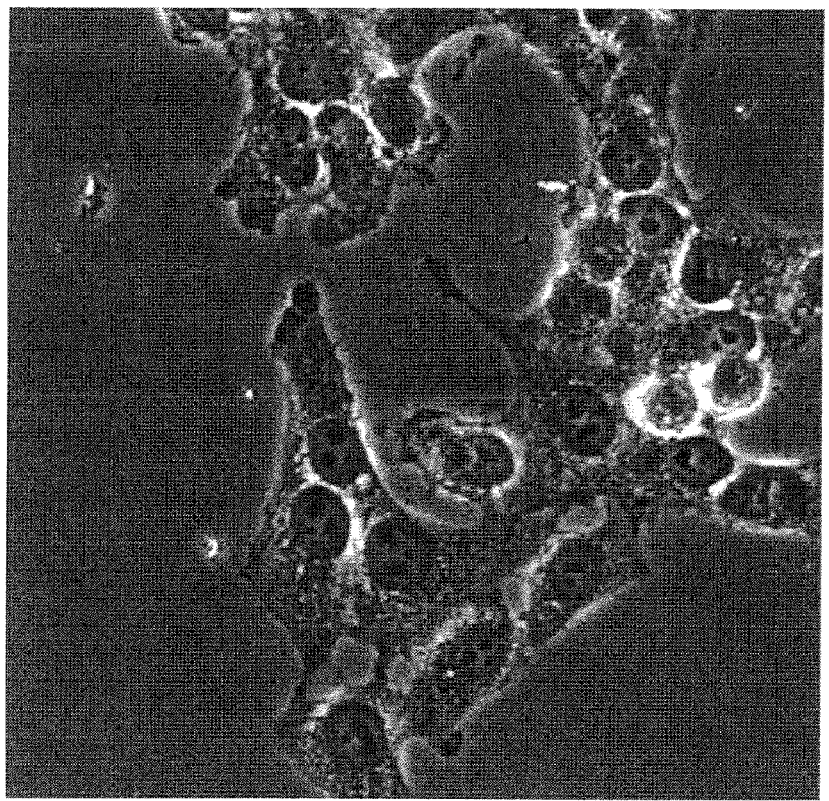
FIG. 5A is a diagram illustrating a microphotograph for which the objective with a 10-fold magnification according to embodiment 3 is used.
Figure 5B:
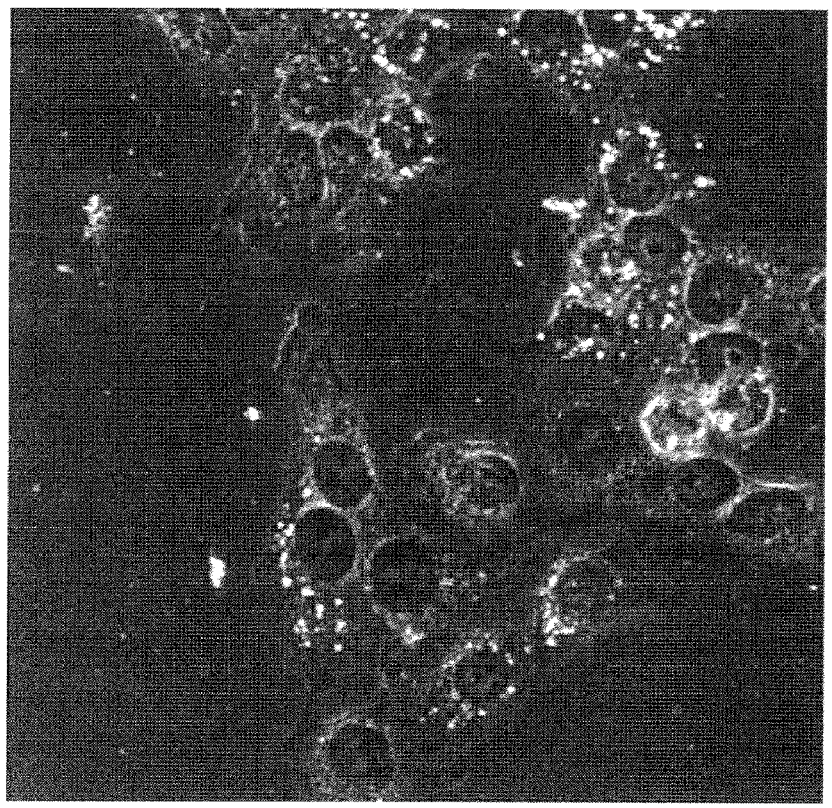
FIG. 5B is a diagram illustrating a microphotograph for which an objective with a 10-fold magnification is used.

FIGS. 5A and 5B are diagrams showing microphotographs that illustrate an effect of combination C1 of the present embodiment.

FIG. 5A is a diagram showing a microphotograph made by photographing a HeLa cell by means of an objective including combination C1 and having a 10-fold magnification (NA=0.4). In this case, the NA of the aperture of a ring slit used ranges from 0.19 to 0.22. In accordance with the NA of the ring slit, the NA of the phase film of the objective ranges from 0.18 to 0.23. When the specifications of the objective with a 60-fold magnification used in combination with the objective with a 10-fold magnification are substituted into conditional expression (2), then $PH_{OB2}/OB_2=0.17<0.2$. Therefore, the photograph illustrated in FIG. 5A satisfies conditional expression (2).

In contrast, FIG. 5B is a diagram illustrating a photograph photographed using the objective with a 10-fold magnification that does not satisfy conditional expression (2). In this case, the NA of the aperture of the ring slit ranges from 0.32 to 0.35. In accordance with the NA of the ring slit, the NA of the phase film of the used objective ranges from 0.31 to 0.37. Since $PH_{OB2}/OB_2=0.28>0.2$, conditional expression (2) is not satisfied.

When FIG. 5A is compared with FIG. 5B, it is found that contrast and resolution are balanced in the image in FIG. 5A. In FIG. 5B, by contrast, edges are highlighted and the image glares. While the structure in a cell can be seen in FIG. 5A, the image of the structure in a cell is lost in FIG. 5B. As described above, by satisfying conditional expression (2), a phase-contrast image and a fluorescent image can be simultaneously observed well.

Figure 6:
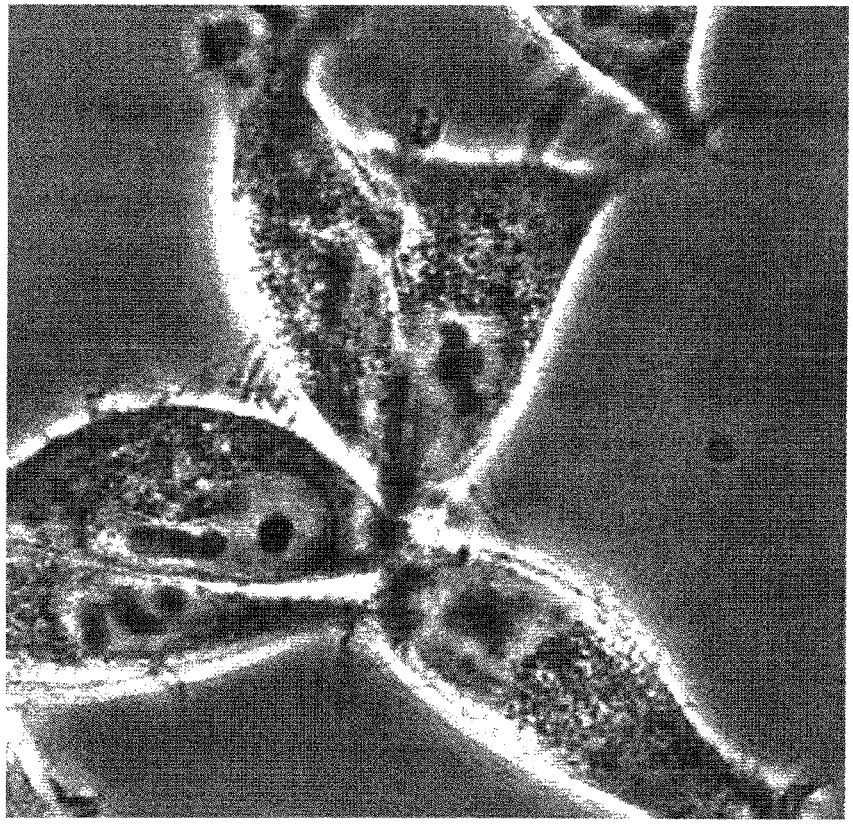
FIG. 6 is a diagram illustrating a microphotograph for which the objective with a 60-fold magnification according to embodiment 2 is used.

FIG. 6 is a diagram showing a microphotograph made by photographing a HeLa cell by means of an objective including combination B1 and having a 60-fold magnification (NA=1.2). Since this objective with a 60-fold magnification satisfies conditional expression (2), the phase film occupies a relatively small area in a pupil. Therefore, even when a ring slit to be shared and used is employed, a fine phase-contrast image is obtained.

The diagram of FIG. 6 is photographed under a condition in which the NA of the aperture of a ring slit ranges from 0.16 to 0.19 and accordingly the NA of the phase film of an objective ranges from 0.10 to 0.23.

What is claimed is:
1. A microscope comprising:
a first phase-contrast objective which includes a first phase film shaped like a ring and which has a 20-fold magnification or lower;
a second phase-contrast objective which includes a second phase film shaped like a ring and which has a 100-fold magnification or higher; and
a ring slit shared and used by the first and second phase-contrast objectives;
wherein:
the first phase film is placed at a pupil position of the first phase-contrast objective, and changes a phase of a laser beam by ¼ wavelength;

the second phase film is placed at a pupil position of the second phase-contrast objective, and changes a phase of a laser beam by ¼ wavelength;

when the first phase-contrast objective is used, the ring slit is placed at a position conjugate to the first phase film;

when the second phase-contrast objective is used, the ring slit is placed at a position conjugate to the second phase film; and the following conditional expression is satisfied:

$$PH_{OB2}/OB_2 \leq 0.15,$$

where $OB_2$ indicates a pupil diameter of the second phase-contrast objective and $PH_{OB2}$ indicates a central diameter of a ring of the second phase film.

2. The microscope according to claim 1, further comprising a third phase-contrast objective having a magnification which is between a magnification of the first phase-contrast objective and a magnification of the second phase-contrast objective, wherein the ring slit is shared and used by the first, second and third phase-contrast objectives.

3. The microscope according to claim 1, further comprising:

a laser light source which emits a laser beam;

a scan unit which scans a specimen surface by the laser beam;

a first detector which detects radiated light from the specimen surface; and a second detector which detects transmitted light from the specimen surface, wherein:

the laser beam is incident from an image side of the first and second phase-contrast objectives;

the first detector is used for fluorescence observation; and the second detector is used for phase-contrast observation.

4. The microscope according to claim 3, wherein: confocal detection is performed by the first detector; and non-confocal detection is performed by the second detector.

5. The microscope according to claim 3, wherein the following conditional expression is satisfied:

$$0.1 \leq PH/FWHM \leq 1,$$

where PH indicates central diameters of the first and second phase films and FWHM indicates a full-width half maximum of a longer axis of the laser beam.

6. The microscope according to claim 3, wherein:

the laser light source is a semiconductor laser; and the laser beam is led from the laser light source to the first or second phase-contrast objective without going through an optical fiber.

7. The microscope according to claim 3, further comprising an image processing unit which images a detection result of each of the first and second detectors, wherein the fluorescence observation and the phase-contrast observation are performed simultaneously.

8. A microscope comprising:

a first phase-contrast objective which includes a first phase film shaped like a ring and which has a 20-fold magnification or lower;

a second phase-contrast objective which includes a second phase film shaped like a ring and which has a 100-fold magnification or higher; and a ring slit shared and used by the first and second phase-contrast objectives;

wherein:

the first phase film is placed at a pupil position of the first phase-contrast objective, and changes a phase of a laser beam by ¼ wavelength;

the second phase film is placed at a pupil position of the second phase-contrast objective, and changes a phase of a laser beam by ¼ wavelength;

when the first phase-contrast objective is used, the ring slit is placed at a position conjugate to the first phase film;

when the second phase-contrast objective is used, the ring slit is placed at a position conjugate to the second phase film; and the following conditional expression is satisfied:

$$S_{PH2}/S_{OB2} \leq 0.03,$$

where $S_{OB2}$ indicates an area of a pupil of the second phase-contrast objective and $S_{PH2}$ indicates an area of the second phase film.

9. The microscope according to claim 8, further comprising a third phase-contrast objective having a magnification which is between a magnification of the first phase-contrast objective and a height magnification of the second phase-contrast objective, wherein the ring slit is shared and used by the first, second and third phase-contrast objectives.

* * * * *